P. B. LASKEY & W. ARNOLD.
Axle Lubricator.
No. 242,141. Patented May 31, 1881.
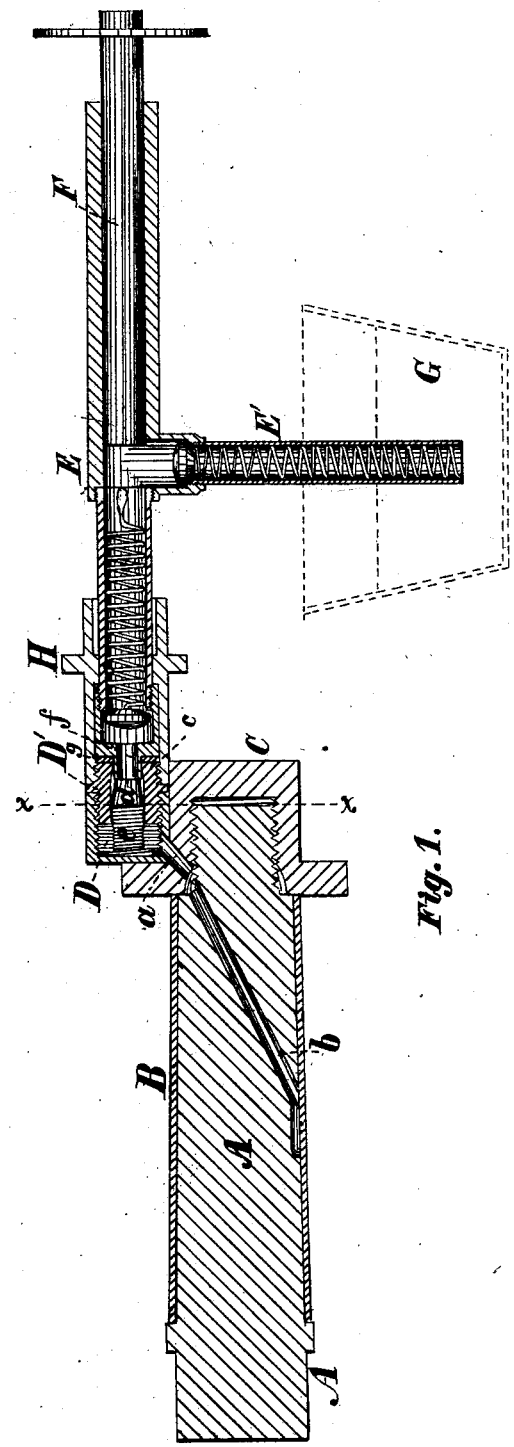
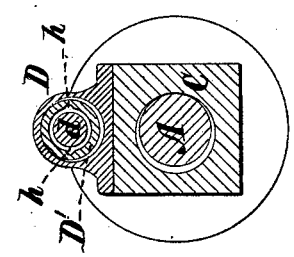
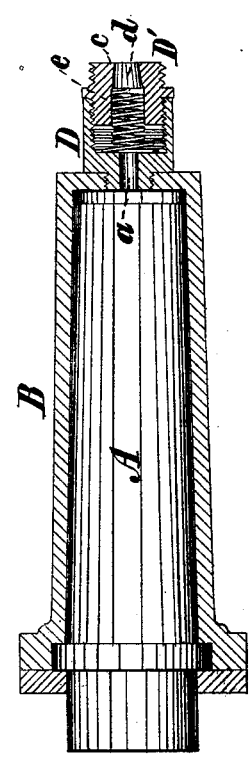
Witnesses:
W. E. Lombard.
C. H. Dodd.
Inventors:
Philip B. Laskey,
William Arnold.
by N. C. Lombard,
Attorney.

UNITED STATES PATENT OFFICE.

PHILIP B. LASKEY AND WILLIAM ARNOLD, OF MARBLEHEAD, MASS.

AXLE-LUBRICATOR.

SPECIFICATION forming part of Letters Patent No. 242,141, dated May 31, 1881.

Application filed November 1, 1879.

*To all whom it may concern:*

Be it known that we, PHILIP B. LASKEY and WILLIAM ARNOLD, both of Marblehead, in the county of Essex and State of Massachusetts, have invented certain new and useful Improvements in Oiling Carriage-Axles, of which the following, taken in connection with the accompanying drawings, is a specification.

Our invention relates to improvements in oiling carriage-axles, whereby such axles may be successfully oiled without removing the wheel or even the holding-nut from the axles; and it consists in the combination, with the axle of a carriage and its box, of an oil-chamber attached to said axle or wheel and communicating with the interior of said box by a suitable passage or conduit, and provided with a supply-orifice having an inwardly-opening and self-closing valve, a force-pump or injector provided with a nozzle adapted to fit said supply-orifice and retract its valve, and a coupling adapted to firmly secure said pump or injector to said oil-chamber during the operation of oiling the wheel.

Figure 1 of the drawings is a central longitudinal section through a wheel-box, a portion of its axle and a force-pump applied thereto and illustrating our invention. Fig. 2 is a vertical transverse section on line *x x* on Fig. 1, and Fig. 3 is a longitudinal central section through a carriage-box, illustrating the manner of applying our invention to a wheel having a box closed at its outer end and secured to the axle by means of a collar upon its inner end.

In Fig. 1, A is the axle and B the hub-box, secured in position on the axle by the nut C in a well-known manner.

To the upper side of the nut C is firmly secured the oil-chamber D, communicating through the hole *a*, made through said nut, and the conduit *b*, made obliquely through the axle A, from its nut-bearing shoulder downward to a point upon the outside of said axle at or near the middle of the length of its bearing-surface within the hub-box.

For new carriages the chamber D may be made in one piece with the nut C, but in altering old carriages it is preferable to construct the chamber separately and attach it to the nut by the well-known process called "sweating."

The chamber D has screwed into its front or outer end a thimble, D', through the center of which is made the supply-orifice *c*, larger at its inner end than at its outer end, and having fitted thereto the tapering plug-valve *d*, behind which is the spiral spring *e*, which acts to hold said valve upon its seat to close said supply-orifice.

E is a pump-cylinder, having fitted thereto the piston F, and provided with a suction-pipe, E', adapted to reach the oil in a vessel, G, (shown in dotted lines,) and with inlet and outlet valves constructed and arranged in any well-known manner. The discharge end of the pump-cylinder is provided with a short pipe or discharge-nozzle, *f*, adapted to enter the supply-orifice *c* and push back the valve *d*, and has fitted thereon, so as to bear against the end of the pump-cylinder, a washer, *g*, of leather, rubber, or other suitable packing material, whereby the joint between the pump-cylinder and the oil-chamber is made tight when the pump is pressed hard against said chamber, and the valve *d* is pressed inward to permit oil to be forced into the chamber and through it and the conduits *a* and *b* into the space between the box B and the axle A.

H is a coupling-sleeve surrounding the pump-cylinder, and adapted to be screwed upon the male thread formed upon the exterior of the thimble D', as shown, to secure the pump firmly to the chamber, if desired. The interior of the inner end of the thimble D' has formed therein one or more grooves, *h*, through which oil forced from the pump, may pass around the valve *d* when said valve is forced back by applying the pump thereto, as shown in Fig. 2.

In Fig. 3 is shown a modification illustrating our invention as applied to a wheel-box that is secured to its axle by means of a collar upon its inner end, in which A is the axle, B the box, and D the oil-chamber screwed into the center of the outer end of the box, as shown, the oil-chamber in all other respects being constructed substantially like that shown in Fig. 1, D' being the thimble, *d* the valve actuated by the spring *e*, and *a* the conduit leading therefrom to the interior of the box B, the pump being applied thereto and operating in connection therewith precisely as heretofore described.

The operation of our invention is as follows:

It being desired to oil a carriage-wheel supplied with our improvements, the suction-pipe E' is placed in any suitable receptacle containing the required oil to be used and the piston is drawn out to charge the cylinder with oil, when the discharge-nozzle is pressed against the valve d to force it inward till the packing g presses hard against the end of the thimble D', when, if the piston F be forced inward, oil will be forced into the chamber D and through the conduits a and b into the space between the axle and box, completely filling said space, when, if the pump be removed, the valve d closes the orifice c and effectually prevents any escape of the oil through said orifice.

In cold weather, when the oil is stiff, or in cases when the oil in the wheel-hub has become gummy or foul from any cause, it is necessary to firmly attach the pump to the oil-chamber by means of the coupling-sleeve H, and the male thread on the outer portion, D', of the oil-chamber, so as to insure a tight packed joint between the pump and the oil-chamber, when there will no difficulty in forcing the oil into the box around the axle.

What we claim as new, and desire to secure by Letters Patent of the United States, is—

In combination with the axle A and box B, the oil-chamber D, communicating with the interior of said box and provided with a supply-orifice, an inwardly-opening self-acting valve, d, and a male screw-thread upon the exterior of its outer portion, a force-pump or injector provided with a discharge-nozzle adapted to enter said supply-orifice and push back the valve d, and a coupling-sleeve, H, provided with an internal thread to engage with the thread on the oil-chamber, all arranged and adapted to operate substantially as and for the purposes described.

Executed at Boston, Massachusetts, this 30th day of October, 1879.

PHILIP B. LASKEY.
WILLIAM ARNOLD.

Witnesses:
N. C. LOMBARD,
C. H. DODD.